(12) United States Patent
Potts et al.

(10) Patent No.: US 9,145,964 B2
(45) Date of Patent: Sep. 29, 2015

(54) LOAD RATING OPTIMIZED BEVEL GEAR TOOTHING

(75) Inventors: Michael Potts, Wismar (DE); Berthold Schlecht, Tankenhagen (DE); Michael Senf, Radeberg (DE); Steffen Schaefer, Dresden (DE); Birgit Hutschenreiter, Ottendorf-Okrilla (DE)

(73) Assignees: SCHOTTEL GMBH, Spay (DE); TECHNISCHE UNIVERSITAET DRESDEN, Dresden (DE)

( * ) Notice: Subject to any disclaimer, the term of this patent is extended or adjusted under 35 U.S.C. 154(b) by 160 days.

(21) Appl. No.: 13/508,967

(22) PCT Filed: May 27, 2011

(86) PCT No.: PCT/EP2011/002626
§ 371 (c)(1),
(2), (4) Date: Jun. 13, 2012

(87) PCT Pub. No.: WO2011/147582
PCT Pub. Date: Dec. 1, 2011

(65) Prior Publication Data
US 2013/0118282 A1    May 16, 2013

(30) Foreign Application Priority Data
May 27, 2010 (DE) .......................... 10 2010 021 771

(51) Int. Cl.
| | |
|---|---|
| *F16H 55/08* | (2006.01) |
| *F16H 55/10* | (2006.01) |
| *F16H 55/17* | (2006.01) |
| *B23F 9/00* | (2006.01) |
| *F16H 1/00* | (2006.01) |
| *B23F 9/02* | (2006.01) |
| *B23F 9/08* | (2006.01) |

(52) U.S. Cl.
CPC *F16H 55/17* (2013.01); *B23F 9/00* (2013.01); *B23F 9/02* (2013.01); *B23F 9/08* (2013.01); *F16H 1/003* (2013.01); *F16H 55/08* (2013.01); *Y10T 29/49467* (2015.01); *Y10T 74/1987* (2015.01); *Y10T 409/103975* (2015.01)

(58) Field of Classification Search
CPC ............ F16H 55/0806; F16H 55/0813; F16H 55/082; F16H 55/0846; F16H 55/0886
USPC .......................................... 74/457, 459.5, 462
See application file for complete search history.

(56) References Cited

U.S. PATENT DOCUMENTS 1,295,231 A * 2/1919 Stewart et al. ............... 74/459.5
1,694,028 A * 12/1928 Wildhaber ................... 74/459.5

(Continued)

FOREIGN PATENT DOCUMENTS

| | | |
|---|---|---|
| DE | 2320340 A | 11/1974 |
| DE | 102005016746 A | 10/2006 |
| JP | 09032908 B | 2/1997 |
| JP | 2002355820 A | 12/2002 |
| JP | 2006090466 A | 4/2006 |

OTHER PUBLICATIONS

International Standard ISO 53; International Organization for Standardization; 1988.

*Primary Examiner* — William Kelleher
*Assistant Examiner* — Jake Cook
(74) *Attorney, Agent, or Firm* — Andrew Wilford

(57) ABSTRACT

The invention relates to a bevel gear wheel (1) of a bevel gear unit, each tooth (2) of which comprises a load flank (3) and a non-working flank (4), wherein the teeth (2) have a helical or spiral tooth trace, in particular a curved tooth longitudinal line, and the teeth (2), in particular the upper meshing region of the teeth, have an octoid tooth shape or a spherical involute tooth shape, and the teeth have an excess material quantity (11) on the load flanks (4) in order to reinforce the load flanks (4), in particular such that the axis (9) that runs through the tooth tip-bisecting point $A_1$ of the tooth tip transverse line (23) and through the midpoint of the gear wheel exhibits asymmetry of the teeth (2). The invention further relates to a method for producing a bevel gear wheel (1) according to one of the preceding claims, in which the tooth geometry is produced by a four-axis or multi-axis method, in particular a five-axis method.

6 Claims, 2 Drawing Sheets

(56) References Cited

U.S. PATENT DOCUMENTS

| | | | |
|---|---|---|---|
| 2,311,006 A * | 2/1943 | Trbojevich | 74/466 |
| 2,445,559 A * | 7/1948 | Boor | 74/459.5 |
| 2,506,756 A * | 5/1950 | Wildhaber | 74/459.5 |
| 5,058,449 A * | 10/1991 | Lindsey | 74/459.5 |
| 5,454,702 A * | 10/1995 | Weidhass | 418/206.5 |
| 6,050,883 A | 4/2000 | Wiener | |
| 6,128,969 A * | 10/2000 | Litvin et al. | 74/458 |
| 7,364,391 B1 | 4/2008 | Stadtfeld | |
| 2004/0221672 A1 | 11/2004 | Fleytman | |
| 2008/0085166 A1 | 4/2008 | Stadtfeld et al. | |

* cited by examiner $\alpha_Z = \alpha_S = 20°$ $\alpha_Z = 25°, \alpha_S = 20°$ $\alpha_Z = \alpha_S = 20°$ $\alpha_Z = 35°, \alpha_S = 18,5°$

LOAD RATING OPTIMIZED BEVEL GEAR TOOTHING

CROSS REFERENCE TO RELATED APPLICATIONS

This application is the U.S.-national stage of PCT application PCT/EP2011/002626 filed 27 May 2011, published 1 Dec. 2011 as WO2011/147582, and claiming the priority of German patent application 102010021771.9 itself filed 27 May 2010.

FIELD OF THE INVENTION

The invention relates to a toothed gear of a bevel gear unit whose teeth each have a load flank and a nonworking flank, and to a method of making it.

BACKGROUND OF THE INVENTION

The design of the tooth geometry of bevel gears is generally effected symmetrically relative to an axis of symmetry that runs through the gear center and radially through the tooth. This is justified on the basis that toothed gears are generally designed and produced to operate equally in both directions (forward and backward).

Depending on the direction of operation, an individual tooth during the transmission of torque has a load flank that is engaged and transmits the torque to the load flank of the opposing tooth, and a nonworking flank. When the toothed gear rotates, the nonworking flank of a tooth comes into contact either partially or not at all with the following opposing tooth of the meshing toothed gear so long as there is no reversal in the direction of rotation.

In practice, bevel gear units often do not require any reversal of the direction of rotation. Nevertheless, the flanks of the individual teeth of a toothed gear are produced identically and further machined for both rotational directions.

There are a variety of approaches for increasing the maximum possible transmission of force for a gear. One approach is to have the surface undergo heat treatment in order to prevent damage to the tooth flanks. Damage to tooth flanks occurs, for example, in response to excessively high contact pressures. To avoid this, manufacture of the tooth geometry is, among other approaches, followed by finishing the surface, i.e. subjecting it to surface treatment or hardening it. In other approaches, the tooth shape is optimized and its basic rack profile is standardized by DIN 867.

OBJECT OF THE INVENTION

The object of this invention is to optimize a bevel gear of the type referenced above so as to improve its load rating and to enable increased torque to be transmitted by the bevel gear.

SUMMARY OF THE INVENTION

These objects are achieved according to the invention by an approach wherein the teeth first of all include a helical or spiral tooth trace, in particular a curved tooth longitudinal line, and wherein second the teeth, in particular the top region of the engaging teeth have an octoid tooth shape or a spherical involute tooth shape, and wherein third the teeth include added material on the load flanks in order to reinforce the load flanks, in particular so that the axis running through the tooth-tip-bisecting point of the tooth-tip transverse line and through the center of the toothed gear reveals an asymmetry of the teeth.

The tooth-tip transverse line is formed by the section of the cutting plane that is perpendicular to the rotational axis of the toothed gear and of the tooth surface (tooth tip surface) of the toothed gear that is radially the most outward.

According to the invention, the teeth include added material on the load flanks to reinforce the load flanks. Added material refers here to the presence of tooth material that is present only on one side of the axis of symmetry when the tooth is viewed symmetrically. The radial tooth axis runs first of all through a point that is located on the tooth-tip transverse line and that divides the tooth-tip transverse line into two equal parts, and secondly through the center of the toothed gear.

This added material is disposed in the lower or inner region of the load flank, in particular inside the lower two thirds or the lower three quarters of the load flank.

It is in particular advantageous if the tangent on any given point of the load flank, in particular on the pitch circle and rolling circle, is flatter than the corresponding tangent in the nonworking flank. The tangent on the load side thus encloses an angle ($\beta$) with the radial tooth axis that is greater than that of the nonworking flank.

The advantageous of this type of asymmetrical tooth profile is an increase in torque transmission that by enlarging the radii of curvature of the load flank results in a reduction in flank contract pressure. As a result, the risk of damaging the tooth, in particular the flank region, is reduced.

The invention furthermore makes it possible to implement variability in the pressure angle on the load side along the tooth-tip longitudinal line. Selecting a larger pressure angle at the tooth heel relative to the tooth toe enables the angular range to be enlarged. As a result, the risk of teeth becoming sharper is counteracted, especially in the toe region. The pressure angles along the tooth flanks can be implemented so as to be variable such that the pressure angles from the tooth heel toward the tooth toe decrease by an amount in the range of 0° to 8°, in particular to 5°.

It is preferably recommended that the pressure angles be implemented as large as possible so that the pressure angle (a) of the load flank measures 25 to 45°, preferably 30° to 40°.

Publications DE 10 2005 016746 and JP 09032908 also show asymmetrical tooth shapes. These include added material on the nonworking flank, unlike the present invention. This finds application primarily in hypoid gear teeth where different tooth shapes result from an axial offset. Added material on the nonworking flank does not result in any increase in the flank load rating, and in some cases can even lead to a decrease. For practical reasons this is implemented in hypoid gears so as to compensate for different sliding and engagement relationships between load flank and nonworking flank.

Whereas current traditional production methods limit the degree of freedom for production and are optimized with the aim of producing multiple teeth of a toothed gear simultaneously, a high-precision production of a toothed gear using a milling or grinding machine, the die of which is guided on four or more axes, can enable a more individualized shaping of the teeth to be implemented.

This also has freedom in fabricating the tooth profile shape. Aside from an octoid shape in which the line of action corresponds to an approximate straight line, a spherical involute tooth shape can be produced that contributes to an improved insensitivity to displacement.

These bevel gears can be employed especially advantageously in large-scale gear units, such as for example used in rudder/propeller propulsion units.

BRIEF DESCRIPTION OF THE DRAWING

Embodiments of the invention are shown in the drawing and described below in more detail.

SPECIFIC DESCRIPTION OF THE INVENTION

Figure 1:
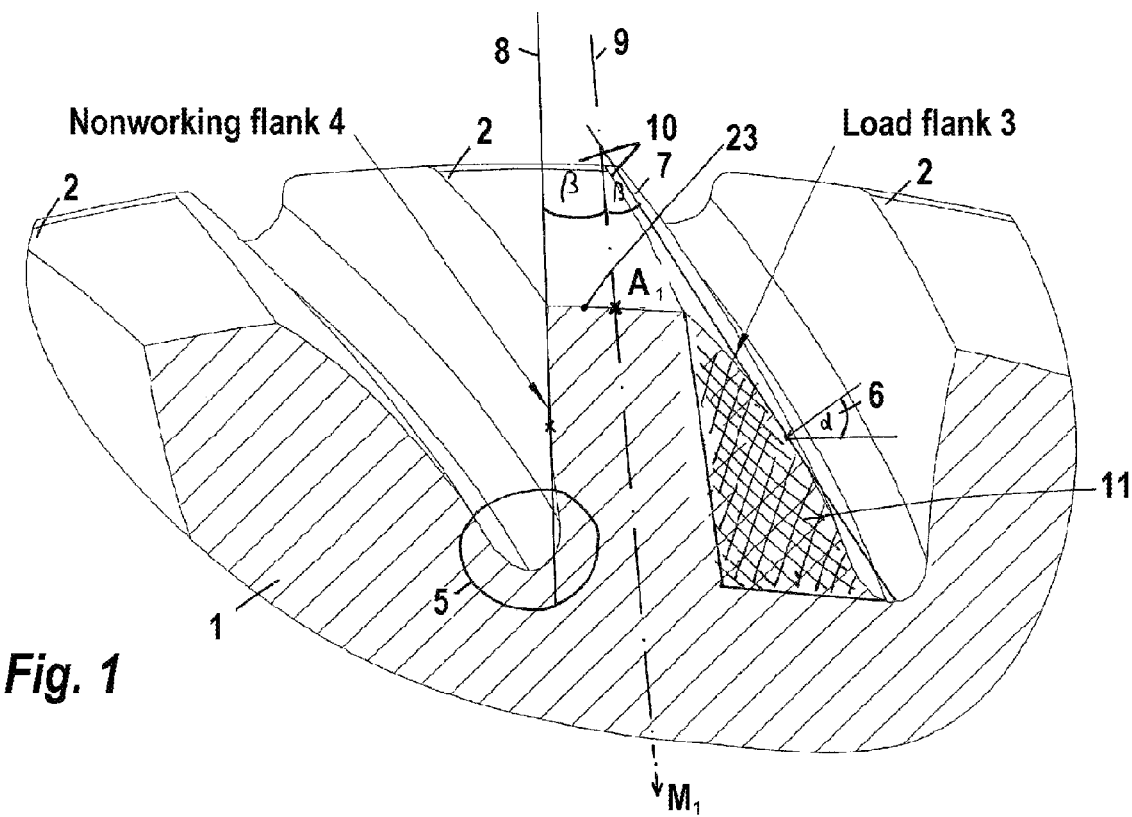
FIG. 1 is a view of the tooth with axis of symmetry and added material.

FIG. 1 shows a bevel gear 1 that has multiple teeth 2 distributed around its circumference, each of which has a load flank 3 and a nonworking flank 4. The load flank 3 and the nonworking flank 4 of two adjacent teeth 2 are connected by a tooth root region 5, also called the "bottom land."

Since a preferred direction of rotation is intended for the transmission of torque, the load flanks 3 and the nonworking flanks 4 have different functions that are determined by a differing geometry.

The load flank 3 serves for torque transmission during normal operation and is designed with a large pressure angle $\alpha$ 6. Pressure angles $\alpha$ of the load flank 3 here measure 25° to 45°, preferably 30° to 40°. The nonworking flank 4 is designed with smaller pressure angles. Due to a flatter tangent 7 at any given point along the load flank 3, illustrated here on the pitch circle or rolling circle, relative to a corresponding tangent 8 of the nonworking flank 4, the tooth has an asymmetrical shape.

Due to the asymmetrical geometry, this new tooth shape lacks the typical tooth center line, such as found in conventional symmetrical teeth. This is replaced by a "radial tooth axis" 9 that runs through a gear center $M_1$ and tooth-tip-bisecting point $A_1$. Tooth-tip-bisecting point $A_1$ divides tooth-tip transverse line 23 into two parts of equal size. The respective tangents at the load flank and nonworking flank each enclose angles $\beta$ 10 of different size with this radial tooth axis. The tangent 8 of the nonworking flank 4 is steeper than the tangent 7 of the load flank 3. As a result, the tangent 7 of the load flank 3 encloses a greater angle $\beta$ 10 with the radial tooth axis 9 than does the tangent 8 of the nonworking flank 4 with the radial tooth axis 9.

If this radial tooth axis 9 is used to compare the load flank 3 and the nonworking flank 4, additional added material 11 becomes evident on the side of the load flank 3. Here the added material 11 increases significantly in the lower or inner region of the tooth, that is, toward the tooth root region 5. The added material 11 of the load flank 3 varies as a function of the tooth geometry and the pressure angle $\alpha$ 6, and can be indicated by a factor f within a numerical range greater than 1.0 to 1.5.

Figure 2:
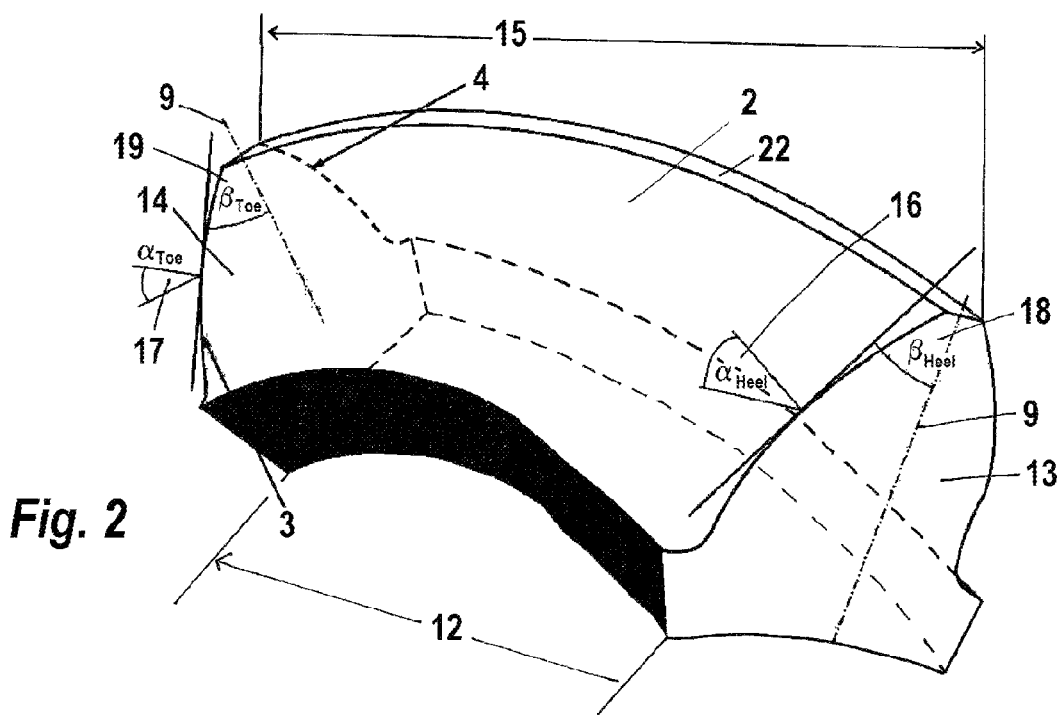
FIG. 2 is a view of the tooth along the tooth flank including different pressure angles.

FIG. 2 shows one shape, by way of example, of a tooth 2 along a tooth width 12 from a tooth heel 13 toward a tooth toe 14. Due to the designed shape of the toothing with its curved tooth longitudinal line, a tooth length 15 here is greater than the tooth width 12. The drawing shows that the pressure angles $\alpha$ 6 at one tooth flank of the tooth heel 13 (pressure angle $\alpha_{heel}$ 16) can be different than at the tooth toe 14 (pressure angle $\alpha_{toe}$ 17). The region of the tooth flank between the tooth heel 13 and the tooth toe 14 thus has a variable pressure angles $\alpha$ 6 along the tooth length 15 that become smaller along the tooth flank from the tooth heel 13 toward the tooth toe 14. The difference for pressure angles 6 of the tooth heel 16 range from 0° to 8°, preferably around 5°. The tangent at the tooth heel 13 is thus flatter relative to the tangent at the tooth toe 14 and thus encloses a greater angle $\beta_{heel}$ 18 than $\beta_{toe}$ 19 at the tooth toe.

Figure 3:
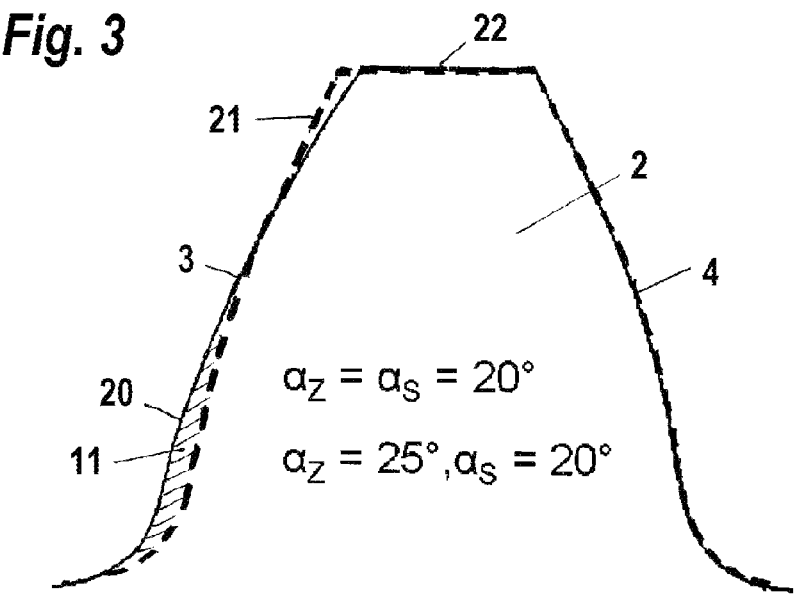
FIG. 3 is a sectional view through the tooth profile with small modifications relative to the basic rack profile in the pressure angles at the tooth heel and tooth toe.

FIG. 3 shows an optimized tooth shape 20 with added material 11. The added material 11 is in the lower or inner region of the load flank 3. The amount of added material 11 on the load side 3 is relatively low compared with the amount of material for the entire tooth. This is due to the difference between the pressure angles of a standard basic rack profile 21 and the optimized tooth shape 20. The pressure angle $\alpha$ 6 in the standard basic rack profile 21 on the load flank 3 at $\alpha_z$=20° is identical on the nonworking flank 4 at $\alpha_s$=20°. The pressure angle $\alpha$ 6 of the optimized tooth shape 20 on the load flank 3 at $\alpha_z$=25° is different on the nonworking flank 4 at $\alpha_s$=25°.

FIG. 3 essentially shows the optimized tooth shape 20 of the teeth 2 in an embodiment with a spherical involute shape. This embodiment cannot be produced with the proposed tooth geometry using traditional fabrication processes such as hobbing and shaving. The optimized tooth shape can, however, be fabricated by a four-axis, in particular by a multiaxis method, in particular a five-axis method. Only in this way can the tool perform with high precision the three-dimensional removal of material that is required for the optimized tooth shape 20 of the teeth 2. The fabrication methods, in particular here are grinding and/or milling.

Figure 4:
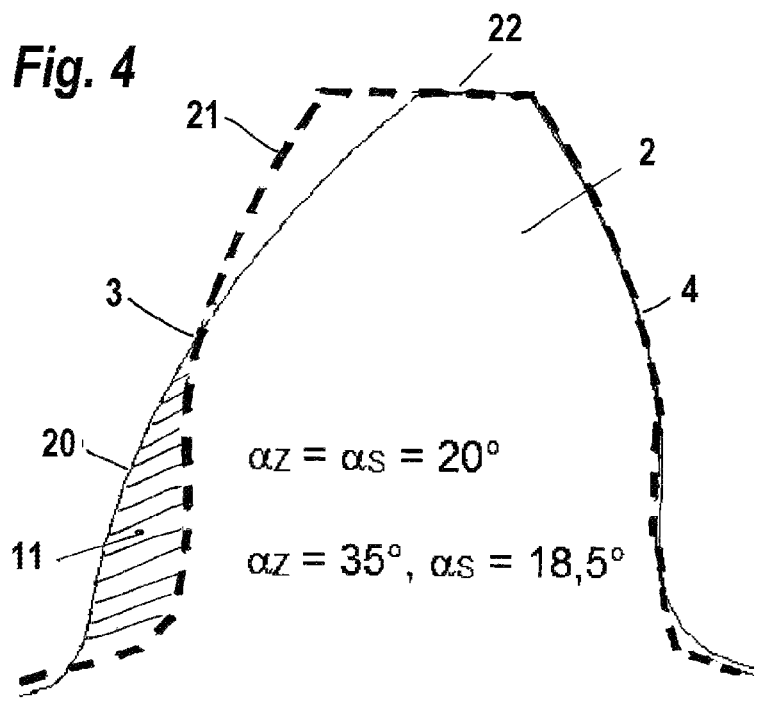
FIG. 4 is sectional view through the tooth profile with large modifications relative to the basic rack profile in the pressure angles at the tooth heel and tooth toe.

FIG. 4 shows another development of the tooth flank that has a significantly greater amount of added material 11 than shown in FIG. 3. This is due to the greater difference between the pressure angles of the standard basic rack profile 21 and the optimized tooth shape 20. The pressure angle $\alpha$ 6 in the standard basic rack profile 21 on the load flank 3 at $\alpha_z$=20° is identical on the nonworking flank 4 at $\alpha_s$=20°. The pressure angle $\alpha$ 6 of the optimized tooth shape 20 on the load flank 3 at $\alpha_z$=35° is different on the nonworking flank 4 at $\alpha_s$=18.5°. FIG. 4 shows here that the tip thickness of a tooth tip 22 can become smaller as pressure angle $\alpha$ 6 increases. The FIG. here compares optimized tooth shape 20 with the tooth tip of standard basic rack profile 21. FIG. 4 also shows optimized tooth shape 20 of teeth 2 with a spherical involute shape on the load side 3 of the tooth 2.

An unillustrated variant has large pressure angles that are sufficiently large that it is not necessary to perform boundary modification in the region of the tooth tip. This is intended to prevent a full hardening that can generally occur below a tooth thickness of 3.0×m. This is critical in order to prevent damage to the tooth tip. This type of boundary modification can be performed as variable tip rounding along the tooth-tip longitudinal line or as a conical tip shortening at the tooth toe.

Another unillustrated embodiment comprises placing added material 11 inside the lower two-thirds or the lower three-fourths of the load flank 3.

The invention claimed is:

1. A bevel gear of a bevel gear unit whose teeth each have a load flank and a nonworking flank, wherein
    the gear has a modulus m in the range of 3 mm to 30 mm;
    the teeth have a helical or spiral toothed trace;
    the teeth, in at least an upper meshing region of the teeth, have an octoid tooth shape or a spherical involute tooth shape;

each tooth has a tooth tip with a variable tip rounding along a tooth-tip longitudinal line or a tip shortening at the tooth toe so as to ensure a tooth-tip thickness greater than 0.3× the modulus m;

the teeth have a tooth-tip transverse line and include added material on the load flanks in order to reinforce the load flanks so that the teeth are asymmetrical to respective axes running through a tooth-tip-bisecting point of each tooth-tip transverse line and through a center of the toothed gear;

the pressure angles of the tooth flanks are 25° to 45° and decrease by a value in the range of 0° to 8° from the tooth heel toward the tooth toe.

2. The bevel gear according to claim 1, wherein the pressure angles of the tooth flanks are variable along the teeth such that the pressure angles of the tooth flanks decrease along the teeth from a tooth heel toward a tooth toe.

3. The bevel gear according to claim 1, wherein the pressure angle of the tooth flanks along the teeth are variable such that the pressure angles decrease by a value in the range of 0° to 8° from the tooth heel toward the tooth toe.

4. The bevel gear according to claim 1, wherein the added material is in the lower or inner region of the load flank.

5. The bevel gear according to claim 1, wherein the added material is within the lower two-thirds or the lower three-fourths of the load flank.

6. The bevel gear according to claim 1, wherein the tangent at any given point of the load flank on the pitch and rolling circle, is flatter than the corresponding tangent of the non-working flank.

* * * * *